Patented May 27, 1930

1,760,000

UNITED STATES PATENT OFFICE

CHARLES S. REDDY, OF AMES, IOWA, ASSIGNOR TO THE QUAKER OATS COMPANY, OF CHICAGO, ILLINOIS, A CORPORATION OF NEW JERSEY

FUNGICIDAL PRODUCT FOR SEED TREATMENT

No Drawing.   Application filed March 17, 1928. Serial No. 262,601.

This invention relates to fungicidal products for treating seeds, such as corn, wheat, oats and other grains, as well as garden seeds.

An object of my present invention is to provide a fungicide for treating seeds, such as seed corn, in order to eliminate therefrom any infection that may have resulted from various organisms, such as Diplodia, Giberella or Basisporium, etc.

Another object of my invention is to provide a fungicide in the form of a dust which will be highly efficient in destroying or eliminating any infection arising from the organisms mentioned above, and others, of seed corn or other seeds that are treated therewith, which fungicide, at the same time, is economical to manufacture and sell.

Another object of my present invention is to provide a fungicide of the aforesaid character which comprises compounds formed by combining various furan derivatives with mercury.

In recent years it has been found that an important cause for low corn yields is the use of seed infected with various organisms, such as Diplodia, Giberella or Basisporium. Such seed-borne diseases as those caused by these organisms result, according to the best authorities, in a loss annually of approximately 5 to 10 per cent of the total corn crop. This loss has been estimated to amount to substantially from 150 million to 300 million bushels of corn annually in the United States. It has been found possible to decrease this loss to some extent by careful selection of the seed corn and further improved results have been obtained by treating the seed corn with fungicidal dusts, the most efficient of which are organic compounds containing mercury.

I have discovered that compounds formed by combining various furan derivatives with mercury are particularly well adapted to serve as fungicides and especially when it is desired to procure a highly efficacious fungicide in the form of a dust. The furan derivatives appear to have the ability to combine with mercury in such manner as to prevent injurious action on the seeds themselves and yet permit the full toxic effect of the mercury and the furan derivatives to be exerted upon the disease organims. It has been found that furfural itself and many of its derivatives possess high fungicidal properties and do not impair to any appreciable degree the vitality or viability of the seeds which have been subjected to treatment with furfural or its derivatives.

By means of my new fungicidal compounds, I have found it possible to control the fungous diseases of corn without injuring the seed corn and thus to increase greatly the percent of germination and the stand, and improve the general quality of the plant itself. Because of these factors resulting from the use of my improved fungicides, I have found that the ultimate yield of corn per acre may be greatly increased.

In preparing my fungicidal material and specially when it is to be employed in the form of a dust, I have combined mercury with the nitrogenous furfural derivatives. Also, I have been successful in combining certain compounds of mercury with furfural derivatives in which nitrogen is not present. Also, I have been able to produce very satisfactory fungicides by combining nitrogenous derivatives of furfural with compounds of mercury.

I will now describe, as specific illustrative examples of my present invention, two fungicidal dusts that have proved satisfactory.

In one form of my invention I combine mercuric chloride with hydrofuramide on an inert filler, such as talc. For example, I take ten parts of hydrofuramide dissolved in forty parts of acetone, adding one hundred parts of talc thereto and mixing the same. Twelve parts of mercuric chloride dissolved in twenty parts of acetone are then added to the said first mixture and the whole is thoroughly intermixed. The resultant material is then dried at a low temperature and pulverized to such fineness (in the neighborhood of three hundred mesh) that it will adhere substantially uniformly to the seed. When treating seed corn I have found that two ounces of the aforesaid dried fungicidal composition per bushel of seed corn gives highly satisfactory results. For convenience I will designate this illustrative example of my invention as dust No. 1.

In another form of my present invention, I proceed as follows: To approximately one hundred sixteen parts of furfural I add twenty-five parts of sodium hydroxide dissolved in ninety parts of water. When this reaction is completed, as will be indicated by cessation of heat formation, I neutralize the free alkali with hydrochloric acid and then add forty parts of ammonium hydroxide. I mix seven hundred twenty parts of talc in six thousand parts of water and add thereto the previously prepared mixture described above. With constant agitation I then add eighty parts of mercuric chloride dissolved in water. The resultant mixture is permitted to settle and the supernatant liquid is then decanted. The residue is dried and pulverized to a fine powder which constitutes my fungicidal dust. I have found that this fungicidal dust gives excellent results when applied at the rate of two ounces per bushel of seed corn. For convenience I will designate this illustrative example of my present invention as dust No. 2.

The above-described specific illustrative examples of my invention have been found extremely effective for treating seed corn but it is to be understood that I am not limiting my present invention to the specific proportions nor to the specific compounds described in connection with these illustrative examples, since I have found that certain other furan derivatives, such as mercury furacrylate, mercury furoate and many others, are efficient seed fungicides. Moreover, while mercuric chloride has been specified, it is to be understood that any soluble mercuric compound that is suitable, may be used in lieu of the mercuric chloride. It will be understood that seed corn or other seeds may be coated with my new fungicides by the methods and equipment ordinarily used in agricultural practice for the treatment of seeds with powdered fungicidal agents.

In order to demonstrate the improved results obtained by treating seed corn with my fungicidal dusts Nos. 1 and 2, described above, I herewith append a table showing the comparative yields obtained with seed corn nearly disease free and infected seed corn untreated and treated with the above specified fungicidal dusts embodying my invention.

| Kind of seed corn | Fungicidal dust | No. of replications | Yields (bushels per acre) | | Increased yields | |
|---|---|---|---|---|---|---|
| | | | Untreated | Treated | In bushels | In per cent |
| Nearly disease free | No. 1 | 30 | 36.8 | 37.0 | 0.2 | 0.7 |
| Nearly disease free | No. 2 | 30 | 36.8 | 35.9 | −0.9 | −1.4 |
| Infected seed | No. 1 | 30 | 27.8 | 37.8 | 10.0 | 36.9 |
| Infected seed | No. 2 | 30 | 27.8 | 34.8 | 6.9 | 25.5 |

It is apparent from the above table that infected seed corn when treated with the fungicidal dusts No. 1 and No. 2, gives a substantially increased yield of bushels per acre over the yield obtained with the same seed corn that has not been treated with my fungicides. Also, the above table indicates that there is no serious deleterious action resulting from the use of my fungicides upon the vitality or viability of seed corn.

In addition to the foregoing specific illustrative examples of my invention, I have found that furfurin when combined with mercury produces a highly satisfactory fungicidal agent for the treatment of seeds for the purpose of controlling the infections caused by the various disease organisms. Moreover, other furan derivatives, such as mercury furacrylate, mercury furoate and mixtures of these have been found to possess useful fungicidal properties.

While I have described herein my invention and several specific illustrative examples, it is to be understood that I am not to be limited to the particular compounds of mercury and furan derivatives embodied in these examples nor to the specific processes described in producing them. My invention is of broad application and I desire that only such limitations be placed thereupon as are set forth in the appended claims.

I claim:

1. A fungicide comprising a reaction product of a mercury compound and a furan derivative.

2. A fungicide comprising a reaction product of a mercury compound, a nitrogen compound, and a furan derivative.

3. A fungicide comprising a reaction product of a mercury compound, an ammoniacal compound, and a furan derivative.

4. A fungicide comprising a reaction product of a mercury compound and a nitrogenous furan derivative.

5. A fungicide comprising a reaction product of a mercury compound and hydrofuramide.

6. A fungicide comprising a reaction product of mercuric chloride and hydrofuramide.

7. A fungicide comprising talc upon which a reaction product of mercuric chloride and hydrofuramide has been precipitated.

8. The process for manufacturing a fungicide, which comprises dissolving a furan derivative in a solvent, adding thereto an inert filler, then adding a mercury compound whereupon the reaction product between the mercury compound and the furan derivative is precipitated upon said inert filler, and then drying and grinding said precipitate and filler.

In witness whereof, I have hereunto subscribed my name.

CHARLES S. REDDY.